Patented Aug. 8, 1939

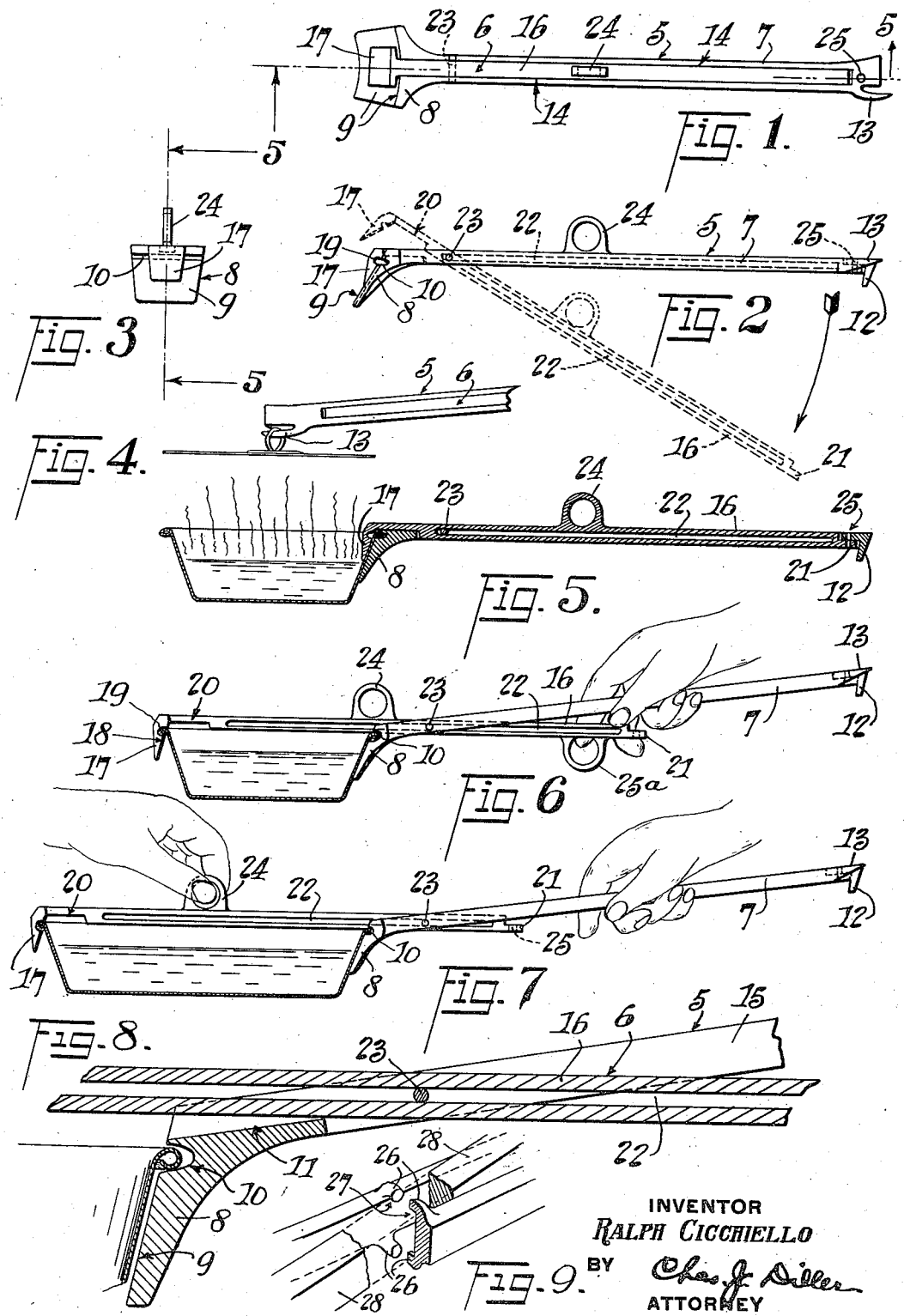

2,168,730

UNITED STATES PATENT OFFICE 2,168,730

POT OR PAN LIFTING IMPLEMENT

Ralph Cicchiello, Waterbury, Conn.

Application October 4, 1938, Serial No. 233,278

6 Claims. (Cl. 294—3)

This invention relates generally to new and useful improvements in article handling devices, and more particularly to pot lifters.

An object of the invention is to provide a pot lifter of simple construction and capable of being economically manufactured, which is adapted to grip one side of a pot or pan, or which can be adjusted to span the pot or pan and engage opposite sides thereof, and which can be adjusted to fit pots or pans of different sizes.

Another object of the invention is to provide a device of the character stated which includes two coacting handle elements each provided with a pot or pan-engaging jaw, said handle elements being pivotally and slidably secured together.

Another object of the invention is to provide a device of the character stated in which one of the handle elements is provided with a finger ring to assist the user in manipulating pots and pans of large sizes.

Another object of the invention is to provide a device of the character stated in which one of the handle elements is provided with a bail or ring-engaging element for lifting pots or pans or covers therefrom.

With these and other objects in view which will more fully appear, the nature of the invention will be more clearly understood by following the description, the appended claims, and the several views illustrated in the accompanying drawing.

In the drawing:—

Figure 1 is a top plan view of a pot lifter constructed in accordance with my invention, Figure 2 is a side elevation thereof, an open position of the jaws being shown in dotted lines, Figure 3 is a front end view thereof, Figure 4 is a fragmentary side view showing the bail or ring-engaging element, Figure 5 is a vertical section taken on line 5—5 of Figures 1 and 3, Figure 6 is a side elevation showing the use of the lifter for relatively small pans, a slightly modified form of the invention being illustrated, Figure 7 is a side elevation showing the use of the lifter for larger pans, Figure 8 is a fragmentary detail section through the body portion of one handle member and the jaw of the other handle member, and Figure 9 is a fragmentary sectional perspective view of a modified feature of the invention.

Referring to the drawing in detail, the invention is embodied in a metallic lifter device including an external handle member 5 and an internal handle member 6.

The external handle member 5 comprises a relatively long and narrow body portion 7 of rectangular cross section which terminates at one end in a downwardly extending jaw 8. The jaw 8 has a width materially greater than that of the body portion and is provided with a concave pot-engaging face 9 having a rim bead-engaging notch 10. The upper face of the jaw is provided with a centrally disposed longitudinal groove 11. The other end of the body portion 7 terminates in a downwardly extending lifter finger 12 and an offset longitudinally extending prong 13. The prong 13 is adapted to manipulate pot covers as shown in Fig. 4 of the drawing. The body portion 7 is provided with a vertical slot 14 extending the greater part of the length thereof and thereby forming side walls 15.

The internal handle member 6 comprises a relatively long and narrow body portion 16 of rectangular cross section and has a moving fit in the slot 14. One end of the body portion 16 terminates in a downwardly extending jaw 17. The jaw 17 has a width greater than that of the body portion 16 but less than that of the jaw face 9, and includes a pot-engaging face 18 having a rim bead engaging notch 19. The part of the body portion immediately adjacent the jaw 17 is undercut as at 20. The other end of the body portion 16 is provided with a longitudinally extending lug 21. A transverse slot 22 is formed in the body portion 16 and has a length substantially equal to that of the vertical slot 14.

In assembled relationship the internal body portion 16 is fitted into the slot 14 of the external handle member and is held therein in sliding and pivotal relation by a pivot pin 23 extending through the transverse slot 22 and across the vertical slot 14. The jaws 8, 17 are disposed adjacent each other with the notches 10, 19 in opposed relationship.

For convenience in handling larger and heavier pots the upper face of the internal body portion 7 is provided with an upstanding rigidly secured finger piece 24 having a finger-engaging opening therein.

When it is desired to store the pot lifter it is merely necessary to hang it on a nail which would project through aligned apertures 25 provided for that purpose in the ends of the handle members, thereby maintaining the component parts of the lifter in a compacted position.

In Figures 5, 6 and 7 are shown various ways in which the lifter is used. In Figure 5 the jaw faces are opposed on opposite sides of one side wall of a pot. In Figures 6 and 7 the lifter is shown adjusted for two different size pans. The adjustment from one size to another is accomplished by merely sliding the inner handle member along the pivot pin 23 and suitably pivoting one part with relation to the other to attain the desired pot rim gripping relations, examples of which are shown in Figures 6 and 7.

The finger 12 may be used to hook under the overhanging rim of a pot or pan and effect the movement thereof to or from an accessible place in which the jaws can not readily be manipulated to lift the pan.

If desired, the under side of the free end of the internal body portion may be provided with a downwardly extending rigidly secured finger piece 25a having a finger engaging opening therein, as shown in Figure 6. This finger piece facilitates handling of the lifter when the jaws are extended.

In Figure 9 of the drawing, there is disclosed a modified form of the invention in which the external handle member is provided with opposed pairs of lugs or fingers 26, 26, having undercut portions 27, and which are positioned on the upper and lower faces of said external member. The fingers define a combined guide and fulcrum for the internal member 28 which in this instance may be of solid construction.

Thus it will be seen that the invention provides a pot lifter of simple construction which comprises two handle members slidably and pivotally connected to permit a wide range of adjustment to lift pots and pans of varying sizes, and includes novel auxiliary pot or cover lifting equipments.

It is of course to be understood that the details of structure and arrangement of parts may be variously changed and modified without departing from the spirit and scope of my invention.

I claim:

1. A pot lifter including a pair of elongated slidably and pivotally mounted handle members, the first having a longitudinal vertical slot and the second having a longitudinal transverse slot, said second member being receivable throughout the major part of its length wholly within the vertical slot of the first member and having pivot means engageable in and movable in said transverse slot, and opposed pot engaging means carried by said members, said opposed engaging members being so shaped and said handle members being of such length that pots can be effectively gripped at one or both sides.

2. A pot lifter including elongated external and internal handle members, said external member being provided at one end with a broad downwardly extending jaw having a pot rim-engaging face and a vertical longitudinal slot, said internal member being provided at one end with a narrow downwardly extending jaw having a rim-engaging face, said internal member having a transverse longitudinal slot and being receivable throughout substantially its whole length within the vertical slot of said external member and having means slidably and pivotally engaging in said transverse slot to enable clamping engagement of said jaws with one or both sides of a pot.

3. A pot lifter including external and internal handle members, means slidably and pivotally mounting said internal member on said external member, and pot gripping means carried by said handle members, said external member being slotted at the end remote from its gripping means for providing a narrow laterally extended longitudinally projected lid lifter prong.

4. A pot lifter including external and internal handle members, the internal member being slidably and pivotally mounted in said external member, and a pot gripping jaw carried by each said member, said handle members being provided with aligned apertures disposed adjacent one end thereof whereby said handles will be maintained in compacted relation when hung upon a supporting pin inserted through said apertures.

5. A pot lifter including elongated external and internal handle members, said external member being provided at one end with a broad downwardly extending jaw having a pot rim-engaging face and a vertical longitudinal slot, said internal member being provided at one end with a narrow downwardly extending jaw having a rim-engaging face, said internal member having a transverse longitudinal slot and being receivable throughout substantially its whole length within the vertical slot of said external member and having means slidably and pivotally engaging in said transverse slot, said internal member being provided with an upstanding finger piece rigidly secured to the upper face thereof at substantially its mid-point and a second downwardly extending finger piece rigidly secured to the lower face thereof adjacent its end whereby manipulation of the lifter will be facilitated.

6. A pot lifter including external and internal handle members, the internal member being slidably and pivotally mounted in said external member, and a pot gripping jaw carried by each said member, said handle members being provided with aligned apertures disposed adjacent one end thereof whereby said handles will be maintained in compacted relation when hung upon a supporting pin inserted through said apertures, and interengaging shoulder portions effective when said apertures are aligned to prevent relative sliding movement of the external and internal handle members.

RALPH CICCHIELLO.